United States Patent [19]

Ryder

[11] Patent Number: 4,785,767

[45] Date of Patent: Nov. 22, 1988

[54] INSULATED WATER CONTAINER

[75] Inventor: Francis E. Ryder, Arab, Ala.

[73] Assignee: Ryder International Corporation, Arab, Ala.

[21] Appl. No.: 922,869

[22] Filed: Oct. 24, 1986

[51] Int. Cl.$^4$ ............................................... A01K 7/00
[52] U.S. Cl. ........................................................ 119/73
[58] Field of Search ........................... 119/73, 61, 72

[56] References Cited

U.S. PATENT DOCUMENTS

| | | | |
|---|---|---|---|
| 1,329,939 | 2/1920 | Todd | 119/73 |
| 3,745,977 | 7/1973 | Martin | 119/73 |
| 4,570,576 | 2/1986 | Noland et al. | 119/73 |
| 4,646,687 | 3/1987 | Peterson et al. | 119/73 |

Primary Examiner—Robert Peshock
Attorney, Agent, or Firm—Trexler, Bushnell, Giangiorgi & Blackstone, Ltd.

[57] ABSTRACT

An insulated water container comprises an enlarged, open-topped receptacle member formed of a thermal insulating material and defining a substantial interior volume, a given depth and a given cross-sectional area at the open top thereof and a cover member formed of a thermal insulating material and of cross-sectional dimensions similar to the open top of the receptacle member for providing a closure for the same. The cover member defines an access opening therethrough, over a minor fractional portion of the area thereof. An insulating wall surrounds the access opening and extends inwardly of the receptacle member to a predetermined depth for extending into and thermally isolating a minor fractional portion of a volume of water in the receptacle member defined within the insulating wall such that its surface is exposed to external conditions from a remaining major fractional portion of the volume of water in the receptacle member such that the latter volume is insulated from external conditions, so as to permit the major fractional portion of the volume of water to act as a thermal mass for substantially retarding temperature changes in the volume of water within the insulating wall and accessible by way of the access opening, and particularly of a portion thereof adjacent the surface.

9 Claims, 1 Drawing Sheet

INSULATED WATER CONTAINER

BACKGROUND OF THE INVENTION

The present invention is concerned with insulated containers, and more particularly with a novel and improved insulated water container for dogs or other pets.

Providing drinking water for dogs or other pets, especially when the pets are kept out-of-doors, creates a number of problems during extreme weather conditions. For example, during winter months when the out-of-doors temperature is substantially below the freezing temperature of water, normal water dishes and the like tend to freeze or fill with ice fairly rapidly, and hence must be frequently emptied and refilled. Similarly, during extremely hot weather, the water may become unpalatably warm relatively rapidly, thus also requiring relatively frequent changing to maintain a relatively fresh supply of cool water for the pet.

When an insulated container or dish is utilized for the water, such heating or cooling may be retarded somewhat. However, such containers are usually open-topped to expose a substantial surface area of the water so that the dog or other pet may have ready access thereto. Unfortunately, the exposure of a substantial surface portion of the water causes relatively rapid changes in temperature thereof during the above-mentioned extremes in weather. Hence, even an insulated container fails to fully alleviate the problem.

If an insulated container of substantial depth or volume is utilized, the thermal mass of water within the container may additionally retard the temperature changes at the surface somewhat. However, I have found that during extremely cold winter months, ice forms relatively rapidly at the surface of the container. This is no doubt due to the density-with-temperature variation in water which causes ice to form at the surface thereof long before freezing of water below the surface.

Accordingly, I have developed a novel and improved insulated water container which insulates a substantial volume and surface area of water from the elements while nonetheless permitting ready access to an adequate surface portion of water for drinking by a dog or other pet. Advantageously, my novel water container completely isolates a relatively small exposed surface portion of the water accessible to the pet from a relatively large volume of water within the insulated container. This provides a substantial volume of available water while insulating a major fractional portion of this volume from external temperature extremes. Moreover, I have found that this substantial volume of insulated water acts as a heat sink or thermal mass to greatly retard changes in temperature of the relatively smaller volume of water in the accessible or exposed drinking area.

BRIEF DESCRIPTION OF THE DRAWINGS

The features of the present invention which are believed to be novel are set forth with particularity in the appended claims. The organization and manner of operation of the invention, together with further objects and advantages thereof, may best be understood by reference to the following description taken in connection with the accompanying drawings in the several figures of which like reference numerals identify like elements, and in which:

DETAILED DESCRIPTION OF THE ILLUSTRATED EMBODIMENT

Figure 1:
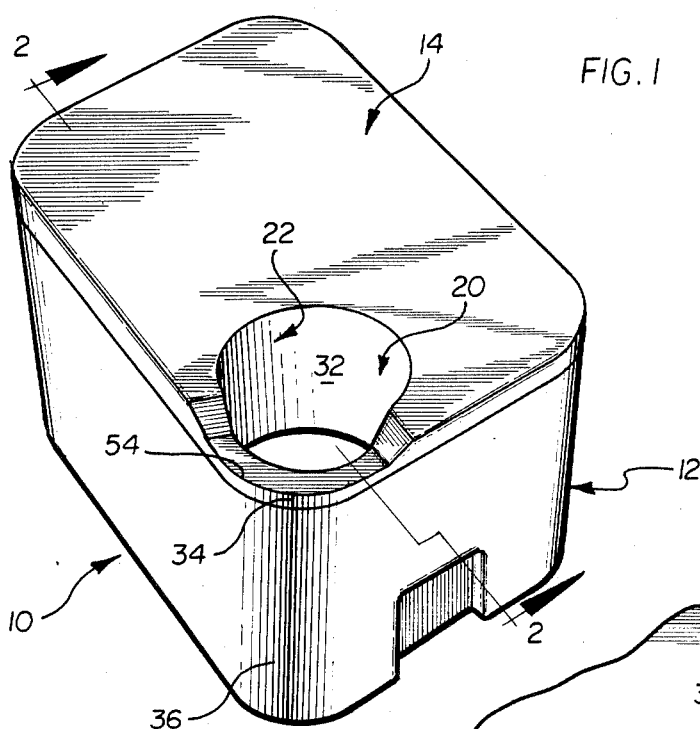
FIG. 1 is a perspective view of an insulated water container in accordance with the invention.
Figure 3:
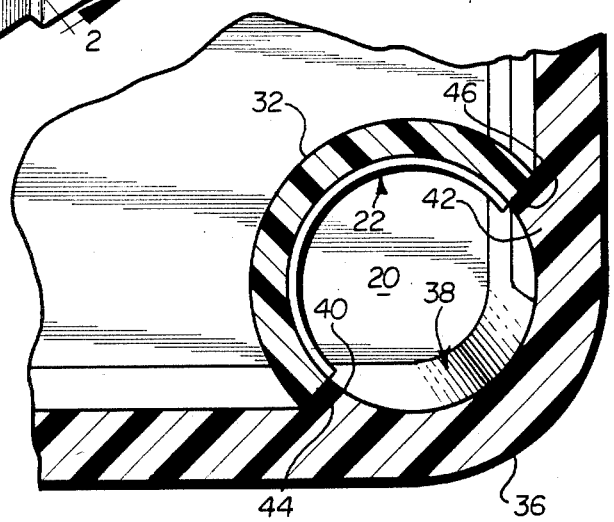
FIG. 3 is a partial sectional view taken along the line 3—3 of FIG. 2.
Figure 2:
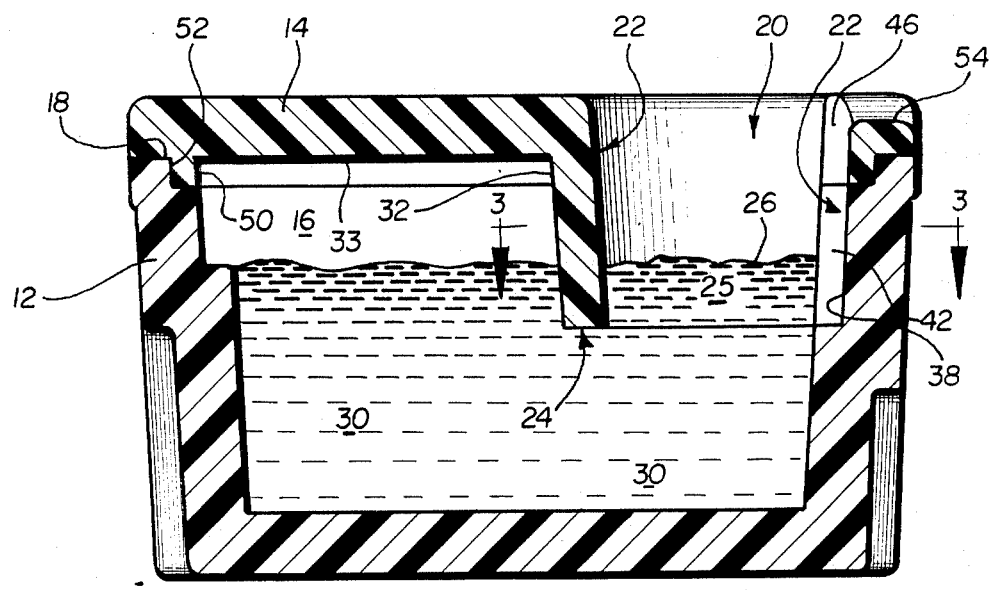
FIG. 2 is an enlarged sectional view taken generally in the plane of the line 2—2 of FIG. 1.

Referring now to the drawings, an insulated container in accordance with the invention is indicated generally by the reference numeral 10. The container is preferably made up of two parts, namely, a receptacle member 12 and a cover member 14. Preferably, the receptacle member is a relatively enlarged member of a thermally insulative material, which defines a substantial interior volume, indicated generally by reference numeral 16. This receptable member 12 also defines a given depth and cross-sectional area defining this interior volume 16. Moreover, the receptacle member 12 is open-topped and defines a given cross-sectional area and configuration at the open top 18 thereof. In the illustrated embodiment, the receptacle member is substantially rectilinear in form having generally rounded or semi-cylindrical corner portions.

The cover member 14 is also formed of a thermally insulative material and has cross-sectional dimensions similar to the outer peripheral dimensions of the open top of the receptacle member for providing a closure therefore. The cover member also defines an access opening 20 therethrough, which opening extends over a minor fractional portion of the area of the cover member. This access opening 20 provides access to water within the container to a dog or other pet.

In accordance with the invention, insulating wall means designated generally by reference numeral 22 are formed or defined around the access opening 20 and the wall means 22 extend inwardly of the receptacle member 10 to a predetermined depth, as indicated generally at reference numeral 24. Advantageously, the insulating wall means 22 serve to isolate a minor fractional exposed surface 26 and corresponding volume 25 portion of the substantial volume of water in the container from the remaining major fractional portion of the volume of water 30. That is, the wall means 22 serve to isolate or insulate the relatively large volume of water 30 from exposure to external conditions. This isolation or insulation provided by wall means 22 permits the major portion of the volume of water 30 to act as a thermal mass for substantially retarding temperature changes in the smaller volume 25 within wall means 22, and particularly that portion of the water adjacent the exposed surface 26 within the wall means 22.

Preferably, the insulating wall means 22 is defined by a first wall portion 32 depending from an undersurface 33 of the cover member 14. The access opening 20 is preferably formed adjacent a peripheral edge portion of the cover member, and the wall portion 32 extends inwardly of the cover member to the aforementioned depth 24 so as to define a portion of the insulating wall means 22. The arrangement is such that an adjacent interior sidewall portion 38 of the container facing the wall 32 forms a remaining portion of the insulating wall means 22.

In the illustrated embodiment, the access opening is substantially circular and formed adjacent one corner 34 of the cover member which overlies a corresponding semi-cylindrical corner portion 36 of the receptacle member 12. Cooperatively, the first wall member 32 is generally semi-cylindrical in form and defines a radius similar to the corner portions 34, 36, such that the wall member 32 and an adjacent interior corner surface or portion 38 of the receptacle member together define the insulating wall means 22. It should be appreciated that other specific shapes and configurations may be utilized without departing from the invention. That is, the invention is intended primarily to isolate a major portion of the volume of the water in the container from external conditions so that this relatively large volume thus forms a thermal mass for retarding temperature changes at the relatively smaller exposed surface and its corresponding volume of water.

In accordance with the preferred form of the invention illustrated, the insulating properties of the container as a whole and of the isolating wall means 22 are further enhanced by achieving relatively close, surface-to-surface fits between the various parts thereof along facing, abutting surfaces thereof.

In this regard, a pair of abutment members or portions 40, 42 extend inwardly of an internal surface of the receptacle member interior sidewall portion 38. These abutment portions are located and configured for closely engaging opposite free edges of 44, 46 of the wall portion or member 32 for thermally sealing the same relative to the receptacle member sidewall portion 38. More particularly, in the illustrated embodiment, the abutment members or portions 40, 42 are generally wedge-shaped and extend inwardly of internal sidewall surface 38 of the receptacle to either side of the corner 36 thereof. The location, extent and configuration of the wedge-shaped portions 40, 42 is such as to define a relatively minor, fractional portion or segment of the cylindrical insulating wall means 22 intermediate the internal sidewall 38 of the container and the respective facing and abutting edges 44 and 46 of the wall portion or member 32.

To further enhance the desired sealing engagement, as well as desired positioning of cover member 14 relative to receptacle member 12, the cover member has a downwardly depending lip 50 spaced somewhat inwardly from the periphery thereof. This lip is positioned for engaging an inner peripheral wall of the receptacle member 12 all about the open top 18 thereof for both positioning and thermally sealing the cover member relative to the receptacle member. Preferably, the receptacle member is provided with an inwardly and downwardly extending shoulder portion or rim 52 of complementary configuration for receiving the lip 50 therewithin, thereby engaging the same about two adjacent, orthogonal surfaces thereof.

In the preferred embodiment illustrated, an outer edge portion of the cover 14 about the access opening 20 and overlying the receptacle member corner portion 36 is recessed as indicated at reference numeral 54 to facilitate access to the access opening 20.

While particular embodiments of the invention have been shown and described in detail, it will be obvious to those skilled in the art that changes and modifications of the present invention, in its various aspects, may be made without departing from the invention in its broader aspects, some of which changes and modifications being matters of routine engineering or design, and others being apparent only after study. As such, the scope of the invention should not be limited by the particular embodiment and specific construction described herein but should be defined by the appended claims and equivalents thereof. Accordingly, the aim in the appended claims is to cover all such changes and modifications as fall within the true spirit and scope of the invention.

The invention is claimed as follows:

1. An insulated water container comprising: an enlarged, receptacle member formed of a thermal insulating material having an open top and defining a substantial interior volume, a given depth and a given cross-sectional area at said open top thereof; a cover member also formed of said thermal insulating material and of cross-sectional dimensions similar to said open top of said receptacle member for providing a closure for the same; said cover member defining an access opening therethrough, said access opening being formed adjacent a peripheral edge portion of said cover member over a minor fractional portion of the area thereof; and an insulating wall member also formed of said thermal insulating material surrounding and depending from a portion of the periphery of said access opening and extending inwardly of said cover member and into said receptacle member to a predetermined depth and having opposite free edges located closely adjacent to spaced apart locations along an interior surface of said receptacle for thermally isolating a minor fractional portion of a volume of water in said receptacle member defined between said insulating wall member and said interior surface of said receptacle such that an upper surface of said minor fractional portion is exposed to external conditions from a remaining major fractional portion of the volume of water in said receptacle member such that the latter volume is insulated from external conditions, so as to permit said major fractional portion of said volume of water to act as a thermal mass for substantially retarding temperature changes in the volume of water within said insulating wall means and accessible by way of said access opening, and particularly of a portion thereof adjacent the surface.

2. A container according to claim 1 wherein said cover member has a downwardly depending lip for engaging an inner peripheral wall of said receptacle member all about said open top thereof for positioning and thermally sealing said cover member relative to said receptacle member.

3. A container according to claim 1 and further including abutment portions extending inwardly of said interior surface of said receptacle member and located and configured for closely engaging said opposite free edges of said insulating wall member for enhancing thermal sealing of the same relative to said receptacle member.

4. A container according to claim 1 wherein said cover and container member are substantially rectilinear in form, having substantially semi-cylindrical corner portions; wherein said access opening is substantially circular and formed adjacent a corresponding corner of said cover member; and wherein said insulating wall member is generally semi-cylindrical and of generally similar radius to said one corner portion and to said access opening.

5. A container according to claim 4 and further including generally wedge-shaped abutment portions extending inwardly of said interior surface of said receptacle member and to either side of said corner portion thereof, said abutment members being located and configured for facing and abutting the opposite free edges of said semi-cylindrical insulating wall member.

6. A container according to claim 4 wherein an outer edge portion of said cover about said access opening and overlying said receptacle member corner portion is recessed to facilitate access to said access opening.

7. An insulated water container comprising: an enlarged receptacle member formed of a thermal insulating material having an open top and defining a substantial interior volume, a given depth and a given cross-sectional area at said open top thereof; a cover member formed of a thermal insulating material and of cross-sectional dimensions similar to said open top of said receptacle member for providing a closure for the same; said cover member defining an access opening therethrough, over a minor fractional portion of the area thereof; and insulating wall means surrounding said access opening and extending inwardly of said receptacle member to a predetermined depth for extending into and thermally isolating a minor fractional portion of a volume of water in said receptacle member defined within said insulating wall means, such that its surface is exposed to external conditions, from a remaining major fractional portion of the volume of water in said receptacle member such that the latter volume is insulated from external conditions, so as to permit said major fractional portion of said volume of water to act as a thermal mass for substantially retarding temperature changes in the volume of water within said insulating wall means and accessible by way of said access opening, and particularly of a portion thereof adjacent the surface; wherein said access opening is substantially circular and formed adjacent one corner of said cover member; and wherein said first wall portion is generally semi-cylindrical and of generally similar radius to said one corner portion and to said access opening; said first wall portion and adjacent interior corner portion of said receptacle member together defining said insulating wall means; and further including generally wedge-shaped abutment members extending inwardly of internal sidewall surfaces of said receptacle member and to either side of said corner portion thereof, said abutment members being located and configured for defining respective minor fractional portions of a substantially cylindrical insulating wall means intermediate said internal sidewall surfaces of said container to either side of said corner portion thereof and facing, abutting edges of said semi-cylindrical first wall portion.

8. An insulated water container comprising: an enlarged receptacle member formed of a thermal insulating material having an open top and defining a substantial interior volume, a given depth and a given cross-sectional area at said open top thereof; a cover member also formed of said thermal insulating material and of cross-sectional dimensions similar to said open top of said receptacle member for providing a closure for the same; said cover member defining an access opening therethrough, said access opening being formed adjacent a peripheral edge portion of said cover member over a minor fractional portion of the area thereof; and an insulating wall member also formed of said thermal insulating material depending from a portion of said access opening and extending inwardly of said cover member and into said receptacle member to a predetermined depth and having opposite free edges located closely adjacent to spaced apart locations along an interior surface of said receptacle for thermally isolating a minor fractional portion of a volume of water in said receptacle member defined between said insulating wall member and said interior surface of said receptacle, such that an upper surface of said minor fractional portion is exposed to external conditions, from a remaining mamor fractional portion of the volume of water in said receptacle member such that the latter volume is insulated from external conditions, so as to permit said major fractional portion of said volume of water to act as a thermal mass for substantially retarding temperature changes in the volume of water within said insulating wall means and accessible by way of said access opening, and particularly of a portion thereof adjacent the surface; and further including abutment portions extending inwardly of said interior surface of said receptacle member and located and configured for closely engaging said opposite free edges of said insulating wall member for enhancing thermal sealing of the same relative to said receptacle member.

9. An insulated water container comprising: an enlarged receptacle member formed of a thermal insulating material having an open top and defining a substantial interior volume, a given depth and a given cross-sectional area at said open top thereof; a cover member also formed of said thermal insulating material and of cross-sectional dimensions similar to said open top of said receptacle member for providing a closure for the same; said cover member defining an access opening therethrough, said access opening being formed adjacent a peripheral edge portion of said cover member over a minor fractional portion of the area thereof; and an insulating wall member also formed of said thermal insulating material depending from a portion of said access opening and extending inwardly of said cover member and into said receptacle member to a predetermined depth and having opposite free edges located closely adjacent to spaced apart locations along an interior surface of said receptacle for thermally isolating a minor fractional portion of a volume of water in said receptacle member for defined between said insulating wall member and said interior surface of said receptacle, such that an upper surface of said minor fractional portion is exposed to external conditions, from a remaining major fractional portion of the volume of water in said receptacle member such that the latter volume is insulated from external conditions, so as to permit said major fractional portion of said volume of water to act as a thermal mass for substantially retarding temperature changes in the volume of water within said insulating wall means and accessible by way of said access opening, and particularly of a portion thereof adjacent the surface; wherein said cover and container members are substantially rectilinear in form, having substantially semi-cylindrical corner portions; wherein said access opening is substantially circular and formed adjacent a corresponding corner of said cover member; and wherein said insulating wall member is generally semi-cylindrical and of generally similar radius to said one corner portion and to said access opening; and further including generally wedge-shaped abutment portions extending inwardly of said interior surface of said receptacle member and to either side of said corner portion thereof, said abutment members being located and configured for facing and abutting the opposite free edges of said semi-cylindrical insulating wall member.

* * * * *